(12) United States Patent
Suzuki et al.

(10) Patent No.: US 6,887,604 B2
(45) Date of Patent: May 3, 2005

(54) FUEL CELL POWER SYSTEM

(75) Inventors: Takanori Suzuki, Saitama (JP); Izuru Kanoya, Saitama (JP); Mitsuya Hosoe, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 232 days.

(21) Appl. No.: 09/975,969

(22) Filed: Oct. 15, 2001

(65) Prior Publication Data

US 2002/0068206 A1 Jun. 6, 2002

(30) Foreign Application Priority Data

Oct. 18, 2000 (JP) .......................................... 2000-323322

(51) Int. Cl.$^7$ .......................... H01M 8/06; H01M 8/04
(52) U.S. Cl. .............................. 429/20; 429/17; 429/26
(58) Field of Search .......................... 429/19, 20, 26, 429/34, 17, 21, 22, 24; 62/46, 47

(56) References Cited

U.S. PATENT DOCUMENTS 5,366,820 A * 11/1994 Tsutsumi et al. ............. 429/19
5,987,895 A * 11/1999 Nishimura et al. ........... 62/46.2
6,195,999 B1 * 3/2001 Arnold et al. ................ 60/649
6,427,639 B1 * 8/2002 Andrews et al. ............... 123/3
6,447,939 B1 * 9/2002 Iwasaki ........................ 429/9
6,589,312 B1 * 7/2003 Snow et al. .................. 75/255

* cited by examiner

Primary Examiner—Jonathan Crepeau
(74) Attorney, Agent, or Firm—Arent Fox, PLLC

(57) ABSTRACT

A fuel cell power system practical for use in a vehicle includes a fuel cell, a first hydrogen storage vessel having a first hydrogen absorbing material storing and releasing hydrogen, a catalytic combustor that heats the first hydrogen storage vessel so as to release hydrogen in order to supply hydrogen to the fuel cell, and a second hydrogen storage vessel having a second hydrogen absorbing material storing and releasing hydrogen and has a hydrogen release temperature that is lower than that of the first hydrogen absorbing material, the second hydrogen storage vessel releasing hydrogen as a fuel for the catalytic combustor under heating by waste heat from the fuel cell. Since the catalytic combustor can generate high temperature heat, a hydrogen absorbing material having a high hydrogen release temperature and a high hydrogen storage capacity per unit weight can be used as the first hydrogen absorbing material.

10 Claims, 4 Drawing Sheets

FUEL CELL POWER SYSTEM

BACKGROUND OF THE INVENTION

1. Field of the Invention

The present invention relates to a fuel cell power system and, in particular, to a fuel cell power system including a fuel cell and a hydrogen storage vessel having a hydrogen absorbing material that can store and release hydrogen in order to supply hydrogen to the fuel cell. Such a fuel cell power system is mounted in, for example, a vehicle.

2. Description of the Related Art

With regard to conventional power systems of this type, an arrangement having heating means that guides low temperature waste heat from a fuel cell to a hydrogen storage vessel by means of a blower is known (Japanese Patent Application Laid-open No. 5-47400).

However, the above-mentioned heating means has the problems that the hydrogen absorbing materials that can be used therein are limited to those that have a low hydrogen release temperature; since such hydrogen absorbing materials have a small hydrogen storage capacity per unit weight, the dimensions of the hydrogen storage vessel must be increased, and the conventional power systems are of little practical use in vehicles.

SUMMARY OF THE INVENTION

It is an object of the present invention to provide a fuel cell power system that has a catalytic combustor that can provide high temperature heat as a heating means for a hydrogen storage vessel, can conserve energy by utilizing low temperature waste heat from a fuel cell as a heat source for releasing hydrogen, which is a fuel for the catalytic combustor, and can use a hydrogen absorbing material having a high hydrogen release temperature and a high hydrogen storage capacity per unit weight, and as a result is practical for use in a vehicle.

In order to achieve the above-mentioned object, in accordance with embodiments of the present invention, there is proposed a fuel cell power system including a fuel cell, a first hydrogen storage vessel having a first hydrogen absorbing material that can store and release hydrogen, a catalytic combustor that can heat the first hydrogen storage vessel so as to release hydrogen in order to supply hydrogen to the fuel cell, and a second hydrogen storage vessel having a second hydrogen absorbing material that can store and release hydrogen and has a hydrogen release temperature that is lower than that of the first hydrogen absorbing material, the second hydrogen storage vessel releasing hydrogen as a fuel for the catalytic combustor under heating by waste heat from the fuel cell.

In accordance with the above-mentioned arrangement, since low temperature waste heat from the fuel cell is utilized for supplying hydrogen to the catalytic combustor, energy can be conserved. Furthermore, since the catalytic combustor can generate combustion heat up to a maximum of about 400° C. by reaction between hydrogen and air (oxygen), it is possible to utilize a hydrogen absorbing material having a large hydrogen storage capacity per unit weight and a high hydrogen release temperature that matches the combustion heat. The dimensions of the hydrogen storage vessel can thereby be reduced.

BRIEF DESCRIPTION OF THE DRAWINGS

Preferred embodiments of the invention are described in detail in conjunction with the drawing figures, in which.

DETAILED DESCRIPTION OF THE PREFERRED EMBODIMENTS

Figure 1:
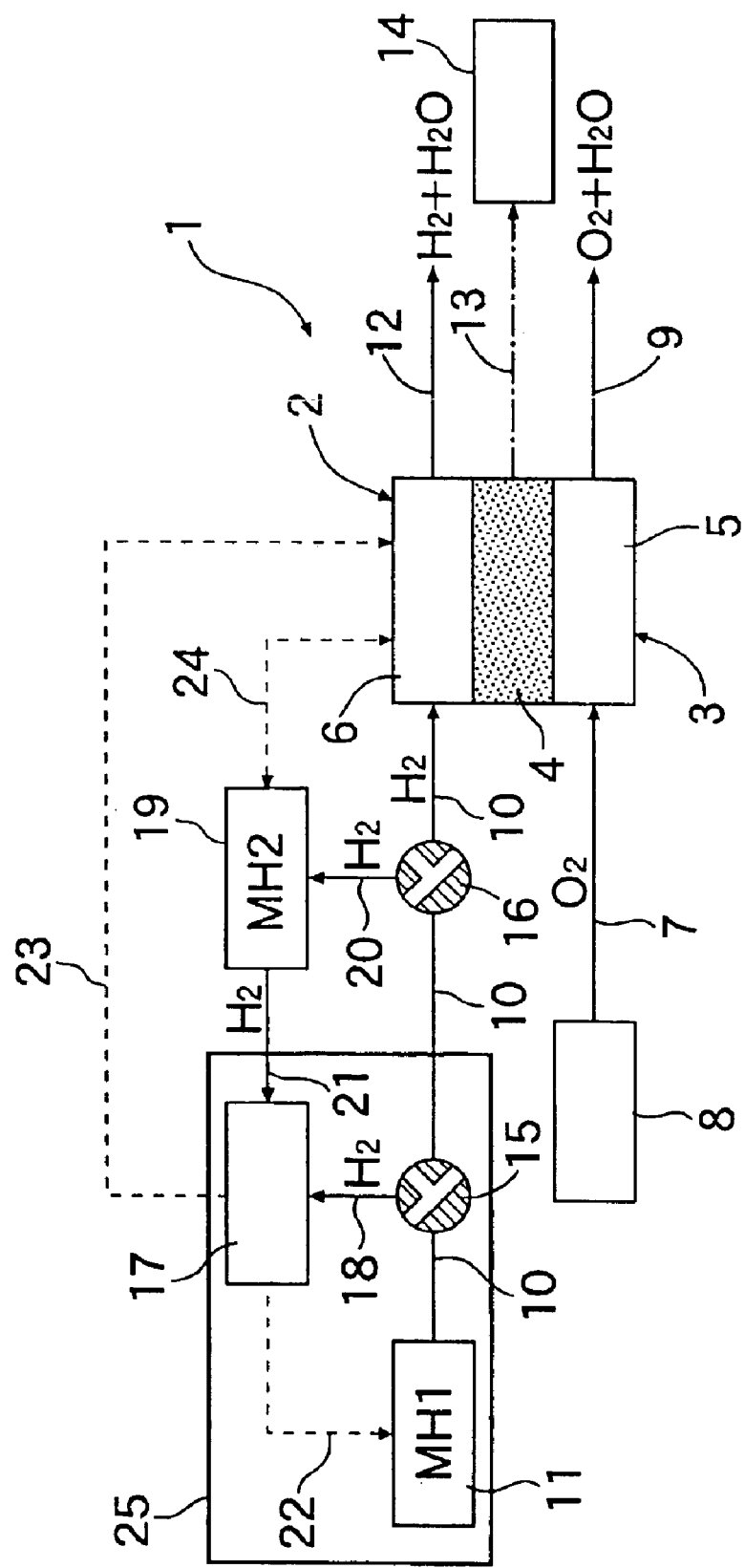
FIG. 1 is a schematic diagram of a fuel cell power system in accordance with embodiments of this invention.

A fuel cell power system 1 shown in FIG. 1 is equipped with a solid polymer type fuel cell as a fuel cell 2, which has an operational temperature of 80° C. The fuel cell 2 has a plurality of cells 3 in a stack, and each of the cells 3 includes a solid polymer electrolyte membrane 4, an air electrode-forming part 5 and a fuel electrode-forming part 6 with the solid polymer electrolyte membrane 4 interposed therebetween. To an entrance of the air electrode-forming part 5 is connected an air supply source 8 via a pipeline 7, and to an exit thereof is connected a pipeline 9 for discharging steam and unreacted air that has not contributed to power generation. To an entrance of the fuel electrode-forming part 6 is connected a first hydrogen storage vessel 11 via a pipeline 10, and to an exit thereof is connected a pipeline 12 for discharging steam and unreacted hydrogen that has not contributed to power generation. It is arranged that the unreacted hydrogen is recycled as fuel for the fuel cell 2. The output side of the fuel cell 2 is connected to, for example, a motor 14 via an electrical cable 13.

The first hydrogen storage vessel 11 comprises a tank and a first hydrogen storage alloy as a first hydrogen absorbing material MH1 with which the tank is filled up. With regard to examples of the alloy MH1, Mg system alloys such as $Mg_2Ni$ alloy and $Mg_{97}Ni_3$ alloy (units in the figures are atom %) can be cited; the hydrogen release temperature of the $Mg_2Ni$ alloy is about 250° C. and that of the $Mg_{97}Ni_3$ alloy is about 280° C.

In the pipeline 10 between the first hydrogen storage vessel 11 and the fuel cell 2 are disposed a first three way valve 15 in the vicinity of the hydrogen storage vessel 11 and a second three way valve 16 in the vicinity of the fuel cell 2. The first three way valve 15 and one entrance of a catalytic combustor 17 are connected to each other via a pipeline 18, and the second three way valve 16 and an entrance of a second hydrogen storage vessel 19 are connected to each other via a pipeline 20.

The second hydrogen storage vessel 19 comprises a tank and a second hydrogen storage alloy as a second hydrogen absorbing material MH2 with which the tank is filled up. With regard to examples of the alloy MH2, $LaNi_5$ alloy, $MmNi_{4.5}Al_{0.5}$ alloy (Mm: misch metal), $Zr(Co_{0.75}V_{0.25})_2$ alloy, etc. can be cited; the hydrogen release temperature of the $LaNi_5$ alloy is about 15° C., that of the $MmNi_{4.5}Al_{0.5}$ alloy is about 20° C. and that of the $Zr(Co_{0.75}V_{0.25})_2$ alloy is about 50° C. These temperatures are lower than the hydrogen release temperature of the first hydrogen storage alloy MH1, and lower than the temperature of waste heat from the fuel cell 2 which is 70° C. The exit of the second hydrogen storage vessel 19 is connected to the other entrance of the catalytic combustor 17 via a pipeline 21.

The catalytic combustor 17 contains platinum, palladium, etc. as a catalyst. Hydrogen supplied from the first and second hydrogen storage vessels 11 and 19 and air, that is to say, oxygen, that is supplied from the outside are reacted in the presence of the catalyst. Combustion heat can thus be generated up to the maximum 400° C., which exceeds the hydrogen release temperature of about 250° C. to about 280° C. of the first hydrogen storage alloy MH1. One exit of the catalytic combustor 17 is connected to the first hydrogen storage vessel 11 via a first heat conveying passage 22, and the other exit thereof is connected to the fuel cell 2 via a second heat conveying passage 23. Furthermore, a heat conveying passage 24 is provided between the second hydrogen storage vessel 19 and the fuel cell 2.

The first hydrogen storage vessel 11, the catalytic combustor 17 and the first three way valve 15 are housed within a thermal insulation housing 25 having a vacuum insulation structure. The thermal insulation housing 25 prevents the combustion heat generated by the catalytic combustor 17 from diffusing outside the system and maintains the temperature of the first hydrogen storage vessel 11 at about 250° C. to about 280° C. after the fuel cell 2 has finished operating, the temperature being maintained for about 48 hours, although this depends on the season, etc. In this case, the insulating function can be enhanced by placing a heat storage material within the thermal insulation housing 25.

Figure 2:
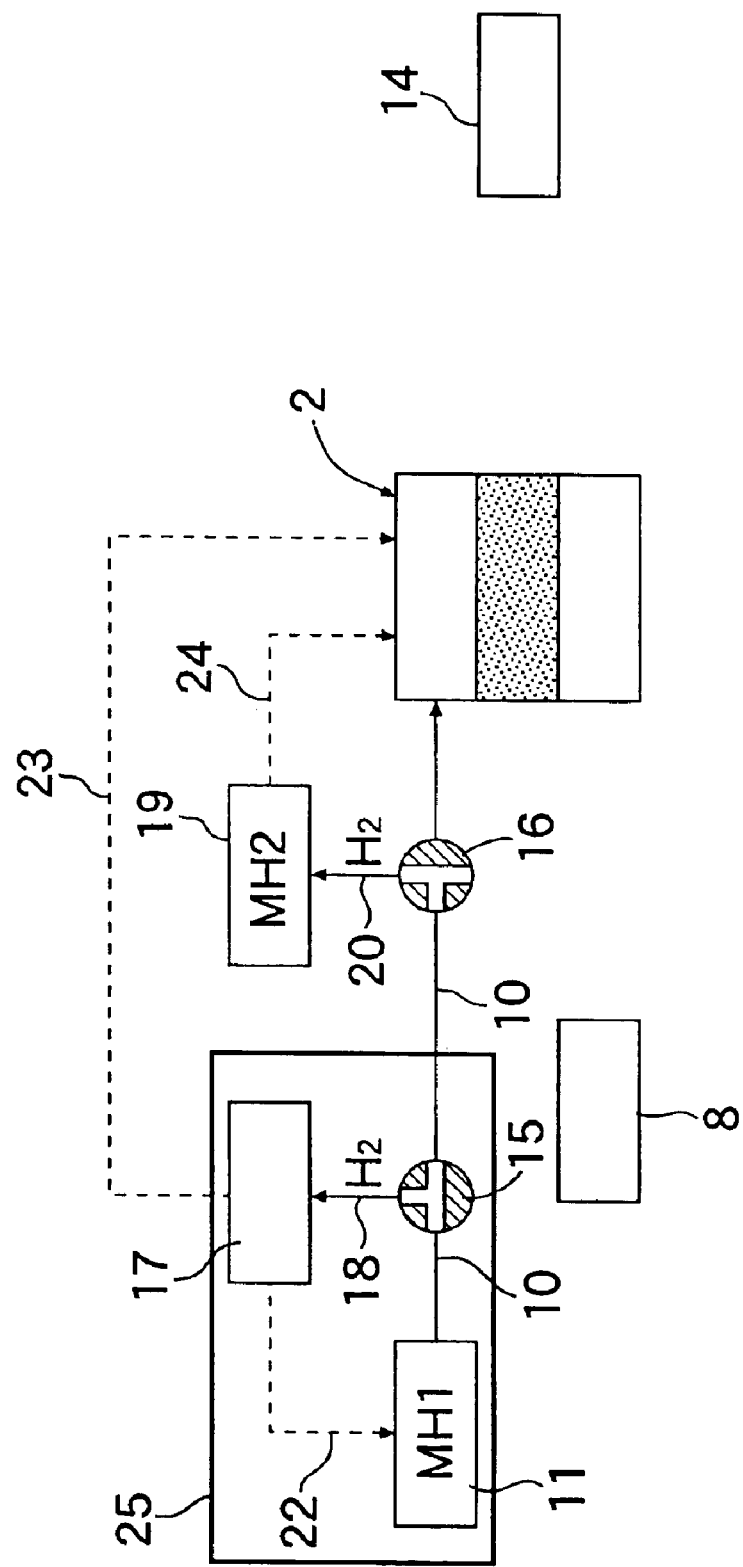
FIG. 2 is a schematic diagram of the fuel cell power system when its operation is starting in accordance with embodiments of this invention.

As shown in FIG. 2, when starting operation of the fuel cell 2, the first hydrogen storage vessel 11, the catalytic combustor 17 and the second hydrogen storage vessel 19 that has a reduced amount of stored hydrogen are connected to each other via the first and second three way valves 15 and 16 so that hydrogen that has been released from the first hydrogen storage vessel 11 is supplied to the catalytic combustor 17 via a section of the pipeline 10, the first three way valve 15 and the pipeline 18 and the hydrogen that has passed through first three way valve 15 is supplied to the second hydrogen storage vessel 19 via a section of the pipeline 10, the second three way valve 16 and the pipeline 20. Hydrogen is burned in the catalytic combustor 17, combustion heat at about 250° C. to about 280° C. that matches the hydrogen release temperature of the first hydrogen storage alloy MH1 is supplied as heat for hydrogen release to the first hydrogen storage vessel 11 via the first heat conveying passage 22, and surplus heat from the catalytic combustor 17 is supplied to the fuel cell 2 via the second heat conveying passage 23 as heat for preheating. On the other hand, in the second hydrogen storage vessel 19, the second hydrogen storage alloy MH2 stores hydrogen thereby generating heat, and the heat so generated is supplied to the fuel cell 2 via the heat conveying passage 24 as heat for heating.

Figure 3:
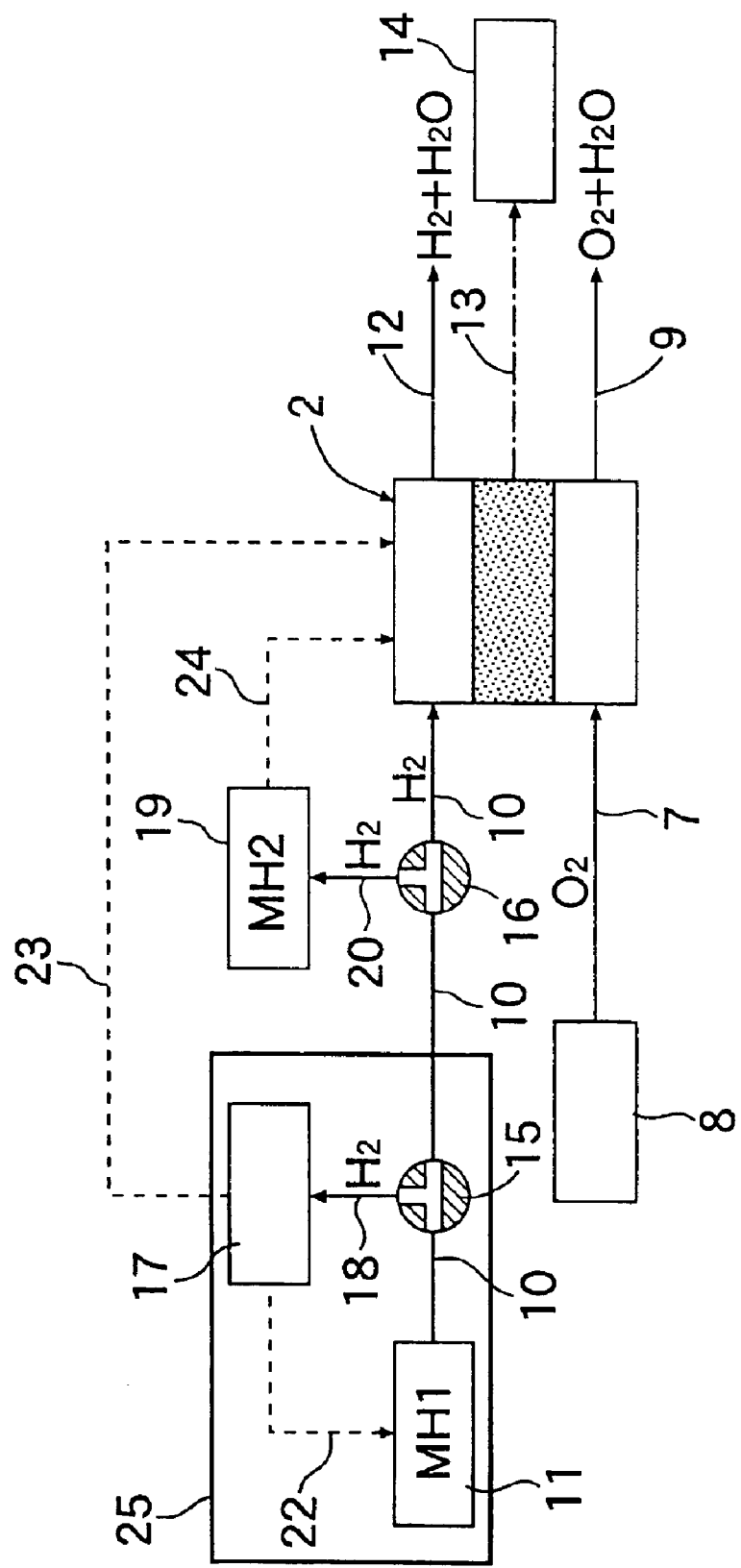
FIG. 3 is a schematic diagram of the fuel cell power system immediately after its operation has started in accordance with embodiments of this invention.

When the amount of hydrogen released from the first hydrogen storage vessel 11 increases, as shown in FIG. 3 the second three way valve 16 provides an additional connection between the first hydrogen storage vessel 11 and the fuel cell 2, and the hydrogen released from the first hydrogen storage vessel 11 is thereby supplied to the fuel cell 2 via the pipeline 10. Since air is also supplied to the fuel cell 2 from the air supply source 8 via the pipeline 7, the fuel cell 2 starts operating and supplies its output to the motor 14.

Figure 4:
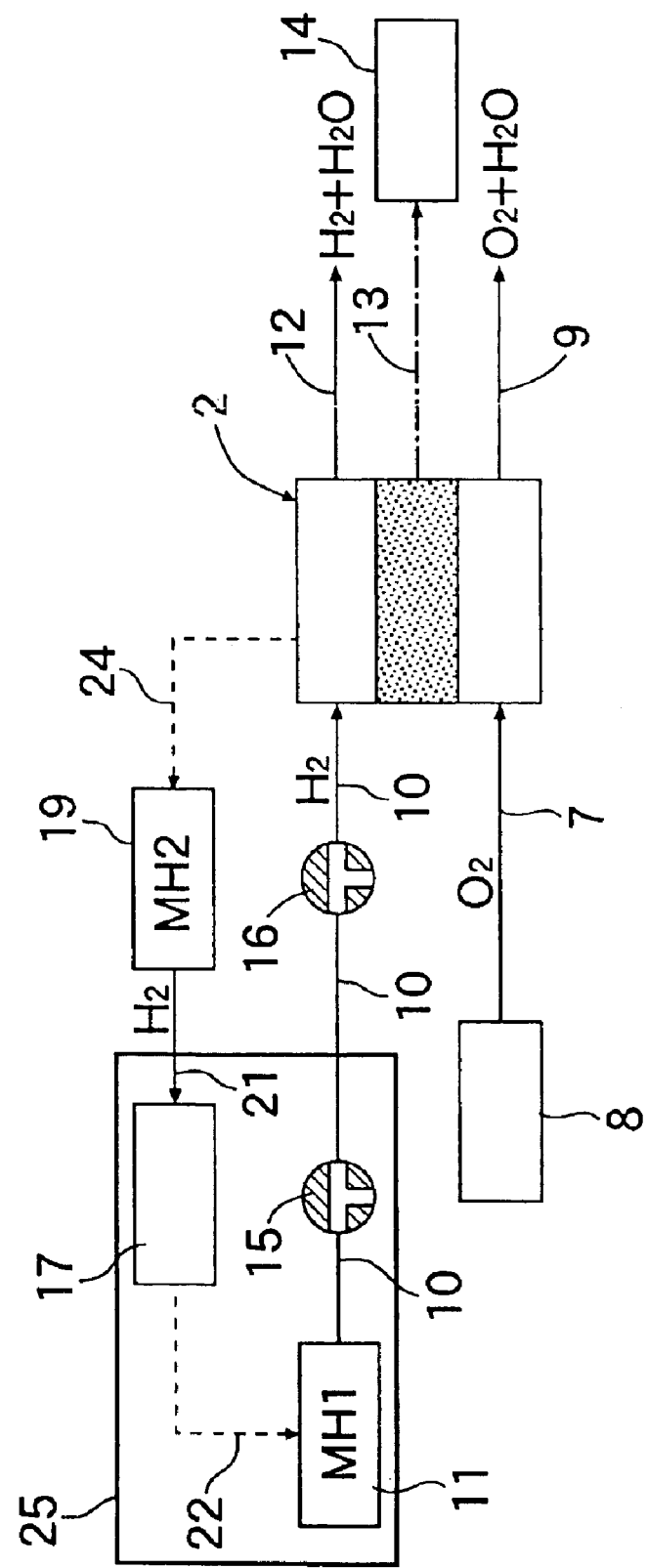
FIG. 4 is a schematic diagram of the fuel cell power system in normal operation in accordance with embodiments of this invention.

As shown in FIG. 4, when the fuel cell 2 is in normal operation, only the first hydrogen storage vessel 11 and the fuel cell 2 are connected to each other via the first and second three way valves 15 and 16, and hydrogen released from the first hydrogen storage vessel 11 is supplied to the fuel cell 2 via the pipeline 10 so continuing its operation. Furthermore, since the waste heat at about 70° C. from the fuel cell 2, for example, from its cooling water, is supplied to the second hydrogen storage vessel 19 via the heat conveying passage 24, the second hydrogen storage alloy MH2 releases hydrogen and the released hydrogen is supplied as a fuel to the catalytic combustor 17 via the pipeline 21. The first hydrogen storage vessel 11 thereby continues to release hydrogen.

The first hydrogen storage vessel 11 may be equipped with an auxiliary heater as, for example, an emergency heat source when the temperature decreases after being left standing for a long time or an additional heat source when an extra fast hydrogen release response is required. It is also possible to use a carbon adsorbing material as a hydrogen absorbing material. Furthermore, the fuel cell 2 and the second hydrogen storage vessel 19 can be integrated so as to efficiently convey waste heat from the fuel cell 2 to the second hydrogen storage vessel 19.

In accordance with the above-mentioned arrangement of the present invention, high temperature combustion heat can be generated while conserving energy, thereby providing a fuel cell power system that can use a hydrogen absorbing material having a high hydrogen release temperature and a high hydrogen storage capacity per unit weight, the fuel cell power system achieving a reduction in the dimensions of the first hydrogen storage vessel and being practical for use in a vehicle.

What is claimed is:

1. A fuel cell power system comprising:
   a fuel cell;
   a first hydrogen storage vessel having a first hydrogen absorbing material (MH1) that can store and release hydrogen;
   a catalytic combustor that heats the first hydrogen storage vessel so as to release hydrogen in order to supply hydrogen to the fuel cell; and
   a second hydrogen storage vessel having a second hydrogen absorbing material (MH2) that can store and release hydrogen and has a hydrogen release temperature that is lower than that of the first hydrogen absorbing material (MH1), the second hydrogen storage vessel releasing hydrogen as a fuel for the catalytic combustor under heating by waste heat from the fuel cell;
   wherein, the system is configured such that, when the fuel cell is starting operation, the first hydrogen storage vessel supplies hydrogen to the second hydrogen storage vessel, and the fuel cell is preheated by heat generated as the second hydrogen absorbing material (MH2) stores hydrogen.

2. The fuel cell power system according to claim 1, wherein the first hydrogen absorbing material (MH1) is an Mg system hydrogen storage alloy.

3. A fuel cell power apparatus comprising:
   a fuel cell;
   a first means for storing hydrogen, said first means having a first hydrogen absorbing material (MH1) that can store and release hydrogen;
   a catalytic combustor that heats the first means so as to release hydrogen in order to supply hydrogen to the fuel cell; and
   a second means for storing hydrogen, said second means having a second hydrogen absorbing material (MH2) that can store and release hydrogen and has a hydrogen release temperature that is lower than that of the first hydrogen absorbing material (MH1), the second means for storing hydrogen releasing hydrogen as a fuel for the catalytic combustor under heating by waste heat from the fuel cell;

wherein the apparatus is configured such that, when the fuel cell is starting operation, the first means for storing hydrogen supplies hydrogen to the second means for storing hydrogen, and the fuel cell is preheated by heat generated as the second hydrogen absorbing material (MH2) stores hydrogen.

4. The fuel cell power apparatus according to claim 3, wherein the first hydrogen absorbing material (MH1) is an Mg system hydrogen storage alloy.

5. A fuel cell cower system comprising:

a fuel cell;

a first hydrogen storage vessel having a first hydrogen absorbing material (MH1) that can store and release hydrogen;

a catalytic combustor that heats the first hydrogen storage vessel so as to release hydrogen in order to supply hydrogen to the fuel cell; and a second hydrogen storage vessel having a second hydrogen absorbing material (MH2) that can store and release hydrogen and has a hydrogen release temperature that is lower than that of the first hydrogen absorbing material (MH1), the second hydrogen storage vessel releasing hydrogen as a fuel for the catalytic combustor under heating by waste heat from the fuel cell;

wherein the fuel cell receives hydrogen only from the first hydrogen storage vessel.

6. A fuel cell power system comprising:

a fuel cell;

a first hydrogen storage vessel having a first hydrogen absorbing material (MH1) that can store and release hydrogen;

a catalytic combustor that heats the first hydrogen storage vessel so as to release hydrogen in order to supply hydrogen to the fuel cell; and a second hydrogen storage vessel having a second hydrogen absorbing material (MH2) that can store and release hydrogen and has a hydrogen release temperature that is lower than that of the first hydrogen absorbing material (MH1), the second hydrogen storage vessel releasing hydrogen as a fuel for the catalytic combustor under heating by waste heat from the fuel cell;

wherein waste heat from the fuel cell is not supplied to the first hydrogen storage vessel.

7. The fuel cell power system according to claim 1, wherein the catalytic combustor receives hydrogen from the second hydrogen storage vessel during normal operation of the fuel cell.

8. A fuel cell power apparatus comprising:

a fuel cell;

a first means for storing hydrogen, said first means having a first hydrogen absorbing material (MH1) that can store and release hydrogen;

a catalytic combustor that heats the first means so as to release hydrogen in order to supply hydrogen to the fuel cell; and a second means for storing hydrogen, said second means having a second hydrogen absorbing material (MH2) that can store and release hydrogen and has a hydrogen release temperature that is lower than that of the first hydrogen absorbing material (MH1), the second means for storing hydrogen releasing hydrogen as a fuel for the catalytic combustor under heating by waste heat from the fuel cell;

wherein the fuel cell receives hydrogen only from the first means.

9. A fuel cell power apparatus comprising:

a fuel cell;

a first means for storing hydrogen, said first means having a first hydrogen absorbing material (MH1) that can store and release hydrogen;

a catalytic combustor that heats the first means so as to release hydrogen in order to supply hydrogen to the fuel cell; and a second means for storing hydrogen, said second means having a second hydrogen absorbing material (MH2) that can store and release hydrogen and has a hydrogen release temperature that is lower than that of the first hydrogen absorbing material (MH1), the second means for storing hydrogen releasing hydrogen as a fuel for the catalytic combustor under heating by waste heat from the fuel cell;

wherein waste heat from the fuel cell is not supplied to the first means.

10. The fuel cell power system according to claim 3, wherein the catalytic combustor receives hydrogen from the second means during normal operation of the fuel cell.

* * * * *